United States Patent Office 3,301,845
Patented Jan. 31, 1967

3,301,845
CATIONIC METAL CONTAINING 8-HYDROXY-QUINOLINE AZO DYESTUFFS
Kenjiro Hosokawa, Osaka, Yasushi Kojima, Hirakata, and Motoo Mori and Masaaki Suzuki, Osaka, Japan, assignors to Kanegafuchi Spinning Co., Ltd., Tokyo, Japan
No Drawing. Original application Jan. 17, 1963, Ser. No. 252,026. Divided and this application Aug. 16, 1965, Ser. No. 480,158
Claims priority, application Japan, Jan. 24, 1962, 37/2,670; Oct. 23, 1962, 37/47,467
9 Claims. (Cl. 260—146)

The present application is a division of copending application, Serial No. 252,026, filed January 17, 1963, and now abandoned.

This invention relates to novel metal-containing dyestuffs, a method of producing same and a dyeing process utilizing said dyestuffs. More particularly, the invention relates to novel cationic metal-containing dyestuffs which differ substantially in various properties from the conventional metal-containing dyestuffs, and a method of producing the same. To be more particular, the invention relates to novel metal-containing dyestuffs useful for dyeing various fibers such as synthetic fibers, semi-synthetic fibers, regenerated cellulose fibers, natural fibers, mineral fibers and the like, any suitable mixtures or blends thereof, and their products (e.f., yarn, fabrics, clothings, etc.), examples of the above-mentioned fibers including those of polyester, polyamide, polyurea, polyacrylonitrile, polyvinyl chloride, polyvinyl alcohol, polyacetate, polypropylene, polyoxymethylene, polyethylene, viscose, cuprammonium rayon, silk, wool, cotton, linen as well as leather and glass.

With certain exceptions, fibers carry negative surface charges in a dye bath, and in the case of the so-called difficultly dyeable synthetic fibers such as polyester and polypropylene fibers, this tendency is so pronounced that with most anionic dyestuffs, it is almost impossible to dye these fibers owing to static problems. Furthermore, the conventional cationic dyestuffs or non-ionic dispersion dyestuffs which are employed to overcome the above-mentioned difficulties have disadvantages with respect to their fastness, particularly their wet color fastness, sublimation fastness, and resistance to dry cleaning.

In this connection, it is further to be understood that the development of mixtures or blends of synthetic and natural fibers has complicated dyeing procedures to such an extent that a plurality of processes have to be actually employed to dye such mixed fibers or products thereof utilizing many different types of dyestuffs in various combinations according to the mode of mixture and the variety of fibers used.

We have found that a novel water-soluble metal-containing cationic dyestuff is obtained when an azo dyestuff having a nitrogen-containing heterocyclic ring with an —OH group in an α-position (e.g. the 8-hydroxyquinoline nucleus) in its molecule, is reacted with a trivalent-chromium compound, a tetravalent-zirconium compound, or a trivalent- or tetravalent-titanium compound in a suitable solvent, and that the dyestuffs thus obtained may advantageously be employed for satisfactorily dyeing various fibers and products such as mentioned before.

There have heretofore been known a number of metal-containing dyestuffs which are typically exemplified by the following chemical structures:

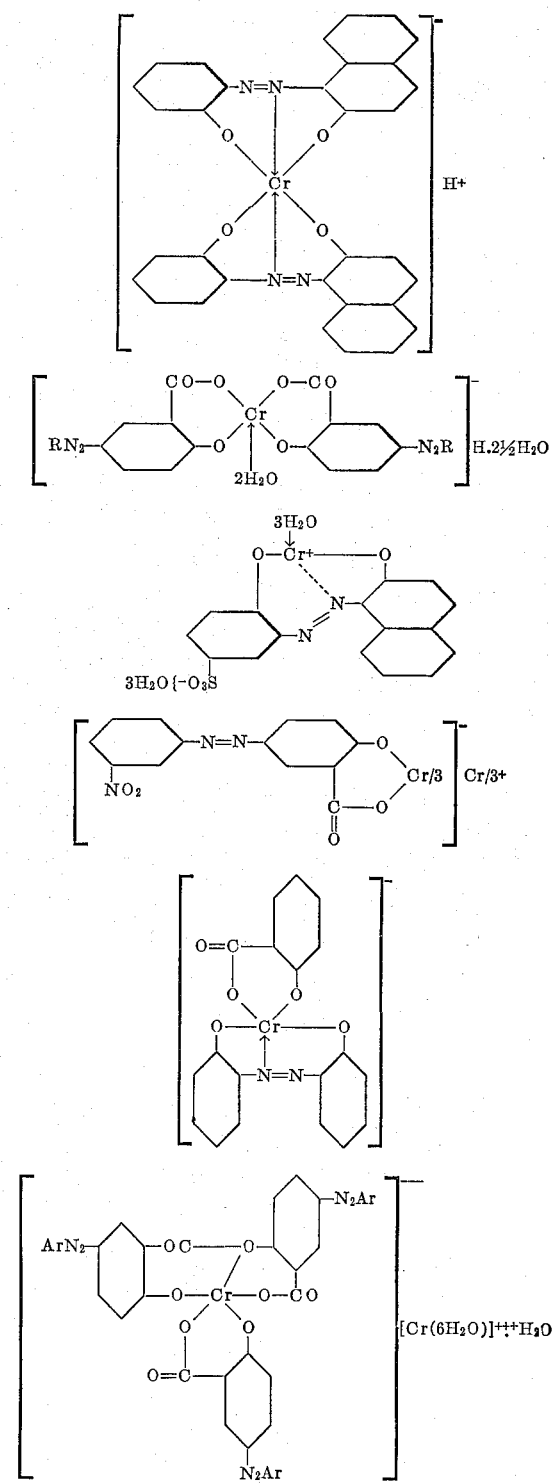

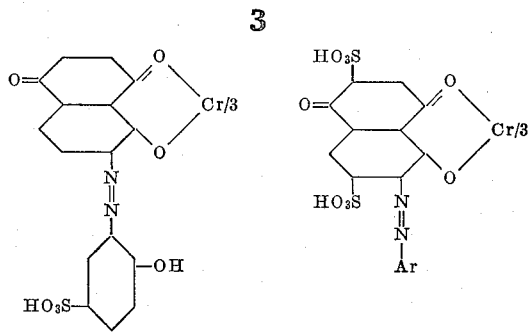

It is apparent from the above structural formulas that the conventional metal-containing dyestuffs are characterized by being anionic and not cationic.

The one and only known cationic metal-containing dyestuff is of the following type:

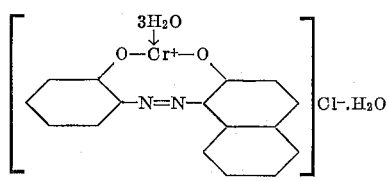

While this type of dyestuffs may be synthesized by heating an alcoholic solution of o-hydroxybenzene-azo-β-naphthol together with chromium chloride, it is so unstable against heating in an aqueous solution that precipitation occurs. Therefore, this substance is not satisfactory for use as a dyestuff.

The dyestuffs of the invention are entirely different from the conventional metal-containing dyestuffs in that they are water-soluble, cationic and stable.

It is noteworthy that the compounds which are the starting materials to be used in the manufacture of the dyestuffs of the invention, have never been used as materials for the conventional metal-containing dyestuffs, and that the synthesis of the metal-containing dyestuffs according to this invention is essentially conducted in a non-aqueous solvent in sharp contrast to the conventional process where water is used as the solvent. It is presumably because of the use of these special starting materials and of the novel, unique manufacturing conditions that the dyestuffs of the invention produced thereunder possesses the novel, unique characteristics which have hereinbefore been described and will more fully be explained and discussed hereinafter.

In practicing the invention, the starting material dyestuffs exemplified below may be employed:

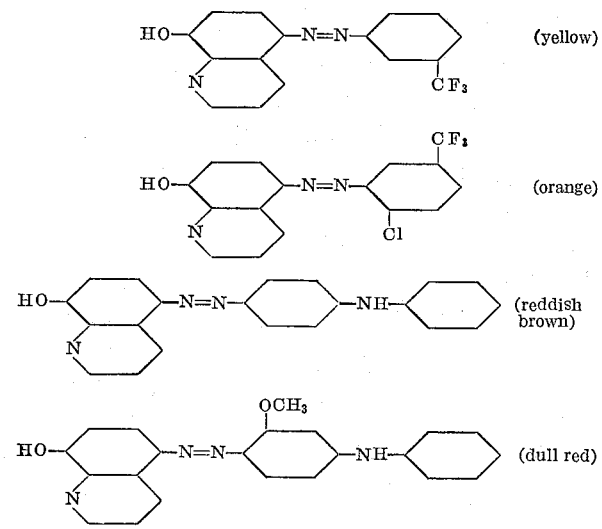

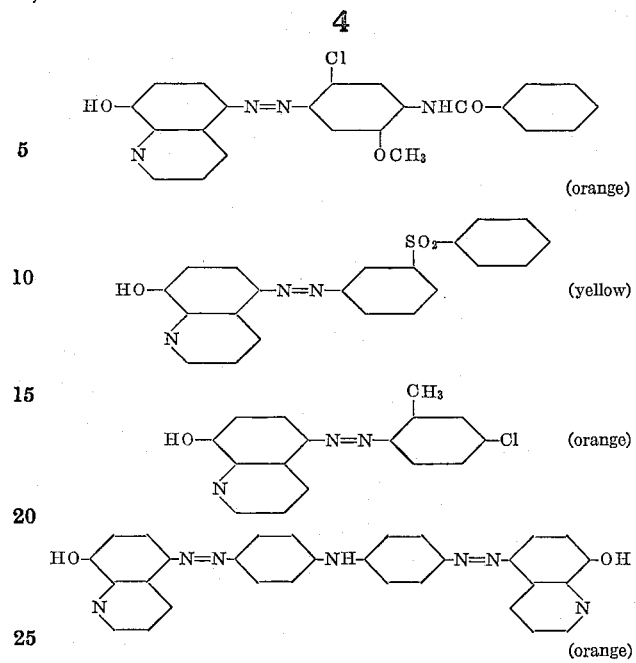

The above-mentioned starting materials may be employed in the form of water-soluble metallic salts such as sodium salts, potassium salts, etc.

The metal compounds which are used in the synthesis of the dyestuffs of the invention by reacting with the aforementioned starting material dyestuffs are preferably compounds of trivalent or tetravalent chromium, titanium, or zirconium which would show acidity, such compounds being exemplified by titanium trichloride, titanium tetrachloride, zirconium oxychloride, chromium chloride, chromium fluoride, chromium formate, etc. Among those salts mentioned above, green crystals of chromium chloride are particularly preferred.

The basicity of the aforementioned metal compounds has to be lower than 50 percent, and preferably lower than 33.3 percent.

The reaction should be conducted in an acidic condition or at a pH below 4 (preferably below 2). Most of the above metal compounds when dissolved in a solvent exhibit a pH below 4. If necessary, however, a suitable acid may be added to the solution to adjust its pH to a preferable one.

The amount of these metal compounds may vary depending on the particular chemical structure of the starting material dyestuff employed. Generally, the use of the metal compound in an amount within the range of 1 to 4 moles per mole of the starting material is most satisfactory in view of the quality of the resulting dyestuff as well as from economic considerations. It should be understood, however, that the use of more than 4 moles of said compound will not adversely affect the yield and quality of the final product.

Preferred amount of the metal compounds with respect to the starting dyestuffs is, e.g. in the case of chromium, 1 atom of Cr per functional radical (α-positioned OH group).

When a chromium compound is employed in an amount less than the number of moles given in the table, the resulting dyestuffs will be unstable and, in many cases, insoluble in water. The use of an excess of the metal will not produce objectionable results but, rather, may serve to accelerate the reaction. However, the practical limitation is that at best up to 4 moles of such metal per each functional group may be employed.

The solvent to be employed in the reaction of the invention has to satisfy the following requirements: (a) It should be capable of dissolving both the starting material or dye and metal compound, (b) it should not exhibit alkalinity, and (c) it has to be at least partially miscible with water. While a number of solvents satisfy such requirements, the most commonly available of such solvents include, for example, alcohols, glycols and ketones, and, more particularly, methanol, ethanol, isopropanol, n-propanol, ethylene glycol, polyethylene glycol and the like. Although, as a rule, water is not allowed to be present in the organic solvent at the commencement of the reaction, it may sometimes be advantageous that the solvent contains a small amount, e.g. up to 20% (based on solvent) of water in order to increase the basicity of the metal compound used and to enable the reaction to proceed more readily. Particularly, in many instances, water of crystallization contained essentially in the metal compound serves to accelerate the reaction of the invention.

The reaction time and temperature should vary according to the particular starting material dyestuff and, also, of metal compound, although, in many instances, the temperature range of 50° C. to 150° C., and, more commonly, up to 100° C. will be satisfactory. In most cases the reaction is completed within about one hour.

The dyestuffs manufactured by the process described hereinbefore exhibit cationic property in the reaction system and also in water, with the number of metal atoms combined to one molecule of the dyestuff being from 1 to 4.

The solids which remain after the solvent is distilled off subsequent to the reaction may be put to use as such. Since the optimum molar ratios of the starting material dyestuff to the metal compound are as described above, and there would remain none unreacted so long as such ratios are strictly adhered to, the solution resulting from the reaction can be directly used for dyeing purposes without isolating the product dyestuff therefrom. Furthermore, some products (some of those dyestuffs which are obtained when titanium or zirconium is employed), once the solvent is completely distilled off, will not dissolve themselves completely in water. If such is the case, it will then be more advantageous to allow a part of the solvent to remain after distillation and put the product to use as a pasty dyestuff. While what might be obtained as by-products, in many instances, would be a trace amount of water or hydrochloric acid, neither of them would cause trouble in the actual use of the product dyestuffs. Where the functional group is —COOH, and if a material containing —COONa is employed in such case, NaCl will be formed as a by-product, which, however, may be easily removed by filtration before the solvent is distilled off.

Hereinafter will be set forth an explanation about the dyeing process utilizing the novel cationic dyestuffs of the invention. While the pH of a dyestuff solution varies according to the type of the metal compound employed, it will show, for instance, a pH value ranging from 1 to 4.5 in water where crystalline chromium chloride is employed as the metal compound. In this instance, it is presumed that the cationic surface activity of the dyestuff overcomes the highly negative charge on the surface of fibers, thereby sufficiently penetrating into the fibers, where the dye is fixed onto the fibers through coordination bond, covalent bond, condensation, or/and insolubilization.

The dyestuffs of the invention may be applied to substrates in any conventional manner, i.e. by dipping, padding, coating, printing and the like. The substrates dyeable with the dyestuffs of the invention include, for instance, all the conventional easy-to-dye fibers, polyester fibers which are generally considered difficultly dyeable, and even fibers of polypropylene which has no active sites. In all cases, the said fibers are dyed vivid, fast colors. Moreover, except glass, most substrates can be successfully dyed with the dyestuff of this invention at a temperature below 100° C., and this fact is particularly beneficial when fibers vulnerable to heat, e.g. polypropylene, are to be dyed. It is to be understood, however, that no substantial trouble will be encountered if fibers are treated at a temperature beyond 100° C. in the dyeing treatment. On the other hand, in the case of cellulosic fibers and silk, satisfactory results may be obtained even when such fibers are dyed in the neighborhood of room temperature, and particularly with silk, this is quite beneficial insofar as it helps silk retain its unique hand. As regards glass it is preferably dyed in the neighborhood of 140° C., under dry conditions.

Among the dyestuffs of the invention are those which, after having been adsorbed on fibrous substrates, are improved in the fixation or/and wet color-fastness upon treatment with an acid binding agent or subsequent heat-treatment. However, these treatments are not always necessary for all the dyestuffs of the invention. Preferred examples of the acid binding agent include caustic alkali, alkali metal salts of, for example, carbonic acid, silicic acid, acetic acid, phosphoric acid, etc., and those alkalis (e.g. bicarbonates) which yield said alkali metal salts when heated. The inclusion of electrolytes such as sodium sulfate, sodium chloride and the like in an aqueous solution of the acid binding agent does not adversely affect the result of dyeing.

It should be appreciated that many of the novel dyestuffs of the invention may be employed in a single dyeing bath for dyeing various combination fabrics such as those containing natural or regenerated cellulose fibers on one hand and synthetic fibers on the other.

It has been found that by selecting suitable conditions, many kinds of combination or blended fabrics can be dyed in a single dyeing bath, and that, as will hereinafter be described in further detail, particularly satisfactory results may be attained in printing.

The printing process of the invention comprises printing a fabric with a printng paste containing one of the dyestuffs of the invention, drying the printed fabric, subjecting the same, then, to heating or steaming at a temperature around 100° C. or, if required, at a temperature higher than 100° C. but not exceeding 240° C., and, if required, reacting the fabric with an acid binding agent in an aqueous medium, it being understood that the last-mentioned treatment may be conducted either before or after said heat treatment.

The printing paste may contain usual assistant agents such as alcohol and glycol and/or organic acid such as acetic acid. As regards the thickening agent, locust bean type or etherified cellulose, for instance, may successfully be employed. Thus, in the examples given hereinafter to illustrate the invention, Indarca A/3v (a locust bean type paste thickener) and Tylose DKL (an etherified cellulose type paste thickener) were employed.

Generally, the wet fastness (washing fastness and potting fastness) of the articles dyed according to the invention is improved by conventional soaping.

Moreover, the articles dyed according to this invention have an excellent degree of fastness also to sublimation and dry cleaning.

This invention will be described in greater detail by reference to the following examples.

*Example 1*

A mixture of 14.5 parts (1/10 mole) of 8-hydroxyquinoline, 5 parts of caustic soda and 30 parts of methanol was dissolved in 500 parts of water. To the solution was then added 17.4 parts (1/10 mole) of diazotized m-trifluoromethylaminobenzene for coupling reaction, which resulted in 31 parts of an orange yellow product. The product was recrystallized from ethanol. 10 parts of the resulting crystal flakes was added to 500 parts of methanol, and the mixture was boiled together with 16 parts of crystalline chromium chloride (3.7% basicity). The starting material dyestuff was low in solubility and, accordingly, there remained a considerable amount of insoluble portions during the initial stage of the reaction, but the dyestuff began to dissolve more freely with the passage of time until it was completely dissolved in 1 hour. After 7 hours' reaction, the solvent was distilled off, whereupon 25 parts of a dark violet dyestuff was obtained. The product developed an orange yellow color upon dissolution in water and had a maximum absorption at 415 mμ.

When 65 parts of a 10% solution of titanium trichloride was employed in place of the crystalline chromium chloride, and the reaction mixture boiled, the resulting solution developed a red color. After 5 hours' reaction, the solvent was distilled off, whereupon 18 parts of a red substance was obtained. This product developed a yellowish color upon dissolution in water and had a maximum absorption at 425 mμ.

Both of the dyestuffs obtained above were found to be cationic when tested in water and in alcohol as follows: a 0.1% solution of the dyestuff was passed through an ion exchange column (1 cm.$^2$×40 cm.) of each of the following resins:

Cation adsorptive resin: Amberlite IR-120
Anion adsorptive resin: Amberlite IRA-400 and the light penetrating power before and after the ion exchange resin treatment was measured. The results showed that the dyestuffs prepared above were cationic.

Cationic dyestuffs were likewise obtained from the following starting material dyestuffs:

terial dyestuffs respectively. The bath temperature was increased to and maintained at 90° C. for 1 hour, at the end of which time the fibers were washed with water and, then, soaped. The dyed fibers were found excellent in wet color fastness, fastness to sublimation, and resistance to dry cleaning.

| Dye No. | Starting material dyestuff | Type of metal | Shade of dyed material |
|---|---|---|---|
| 1 | HO—[quinoline]—N=N—[phenyl-CF$_3$] | Cr | Orange yellow. |
| 2 | Same as above. | Ti | Yellow. |
| 3 | Same as above. | Zr | Orange. |

*Dyeing Example 2*

This example illustrates dyeing of mixed cotton-polypropylene fabrics.

In a bath containing a solution of 0.1 part of each of the following dyestuffs in 300 parts of water were immersed 10 parts of a sample of the above-mentioned re-

| Example No. | Starting material dyestuff | Type of metal | Shade of dye solution |
|---|---|---|---|
| 2 | HO—[quinoline]—N=N—[phenyl-CF$_3$] | Zr | Orange. |
| 3 | HO—[quinoline]—N=N—[phenyl]—NH—[phenyl] | Cr | Reddish brown. |
| 4 | HO—[quinoline]—N=N—[phenyl-OCH$_3$]—NH—[phenyl] | Cr | Somber. |
| 5 | HO—[quinoline]—N=N—[phenyl-SO$_2$-phenyl] | Cr | Yellow. |
| 6 | HO—[quinoline]—N=N—[phenyl(Cl)(OCH$_3$)]—NHCO—[phenyl] | Cr | Orange. |
| 7 | HO—[quinoline]—N=N—[phenyl]—NH—[phenyl]—N=N—[quinoline-OH] | Cr | Do. |
| 8 | HO—[quinoline]—N=N—[phenyl(Cl)(NO$_2$)] | Zr | Orange yellow. |

*Dyeing Example 1*

This example shows dyeing of polyoxymethylene and polypropylene fibers.

The said fibers were immersed in a bath containing a solution of 0.2 part of each of the cationic dyestuffs manufactured by metal-complexing the following starting mafined, bleached and mercerized mixed fabric (50:50). The bath temperature was held at 90° C. for 1 hour, at the end of which time the fabric was washed with water and, then, soaped. The fabric was uniformly dyed, and was found excellent in wet color-fastness and color-fastness to sublimation, dry cleaning and friction.

| Dye No. | Starting material dyestuff | Type of metal | Shade of dyed material |
|---|---|---|---|
| 1 | 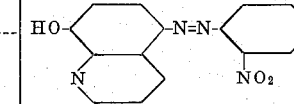 | Cr | Orange yellow. |
| 2 | Same as above. | Zr | Do. |

*Dyeing Example 3*

This example illustrates printing of fabrics of the following mix-spun fibers.

(1) Mix-spun fiber broadcloth: polypropylene-cotton (50:50)
(2) Mix-spun fiber broadcloth: polyester-cotton (65:35)
(3) Mix-spun fiber cloth: copolymer (60% vinyl chloride, 40% acrylonitrile)-cotton.

A dyeing paste of the following composition was employed:

| | Parts |
|---|---|
| Dyestuff of the invention (see below) | 3 |
| Polyethylene glycol | 3 |
| Acetic acid (50%) | 2 |
| Water | 42 |
| Indarca A/BV (8% aqueous solution) | 50 |
| | 100 |

The paste was applied to each of the above-mentioned previously refined mix-spun fiber fabrics on a screen printing machine and, after drying, the fabric was padded with an aqueous solution containing 0.2% of soda ash and 20% of crystalline Glauber's salt at room temperature, and then steamed at 100° C. for 5 minutes, at the end of which time the fabric was washed with water, subjected to soaping with an aqueous solution containing 0.3% of soap and 0.2% of soda ash at 60° C. for 10 minutes, washed with hot water, and washed again with water. The fabrics were found to have been colored uniformly and to be excellent in wet color-fastness and fastness to both sublimation and dry cleaning.

| Dye No. | Starting material dyestuff | Type of metal | Shade of dyed material |
|---|---|---|---|
| 1 | 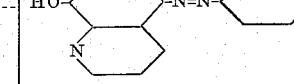 | Ti | Yellow. |

*Dyeing Example 4*

This example illustrates dyeing of glass.

In a solution of 0.5 part of each of the following dyestuffs in 100 parts of water was immersed a sample of glass fiber. The fiber was squeezed, dried, and heat treated at 140° C. for 3 minutes. The colored fiber was fast to hot water and washing.

| Dye No. | Starting material dyestuff | Type of metal | Shade of dyed material |
|---|---|---|---|
| 1 | 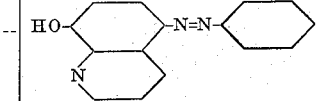 | Cr | Orange yellow. |
| 2 | 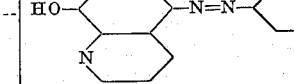 | Zr | Orange. |

*Dyeing Example 5*

This example illustrates dyeing of wool, silk, nylon and cotton.

In a dyeing bath containing a solution of 0.3 part of each of the following dyestuffs in 500 parts of water was immersed 10 parts of each of the above-mentioned fibers. The bath temperature was increased to and maintained at 80° C. for 1 hour. Cellulosic fibers and silk could be dyed satisfactorily even at room temperature and the dyed substrates had an excellent color fastness. An alcoholic solution of such a dyestuff could also be utilized with equal success.

| Dye No. | Starting material dyestuff | Type of metal | Shade of dyed substrate |
|---|---|---|---|
| 1 | 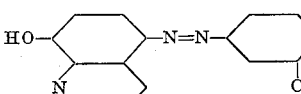 | Cr | Yellow. |
| 2 | Same as above. | Zr | Do. |

What is claimed is:

1. A water-soluble thermostable cationic complex metal compound of a member selected from the group consisting of the dyes of the formulae

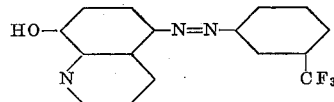

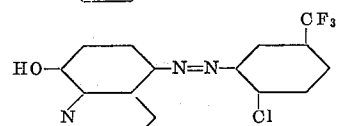

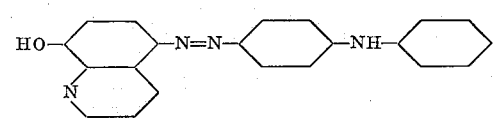

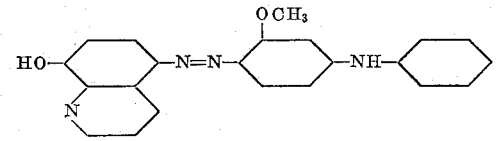

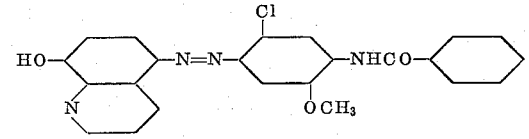

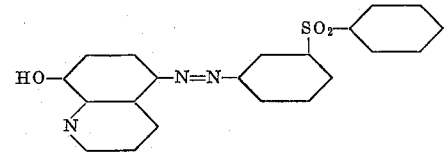

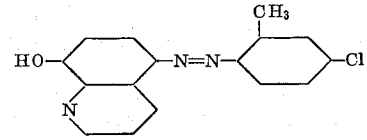

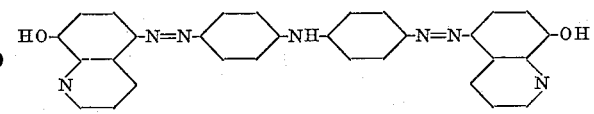

the metal being selected from the group consisting of trivalent chromium, tetravalent zirconium, trivalent titanium and tetravalent titanium, obtained by reacting the corresponding member of the said group, as starting dye, with from 1 to 4 moles, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

2. The water-soluble thermostable cationic complex metal compound of the dye of the formula

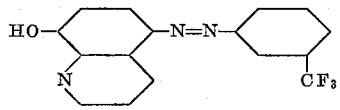

obtained by reacting 1 mole, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

3. The water-soluble thermostable cationic complex metal compound of the dye of the formula

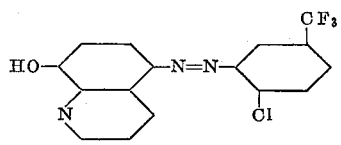

obtained by reacting 1 mole, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

4. The water-soluble thermostable cationic complex metal compound of the dye of the formula

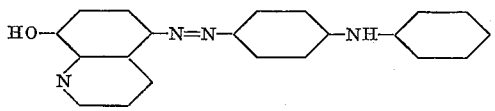

obtained by reacting 1 mole, per mole at starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

5. The water-soluble thermostable cationic complex metal compound of the dye of the formula

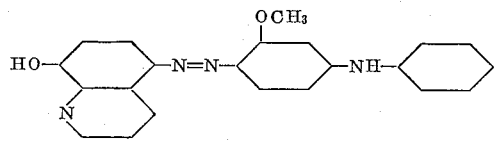

obtained by reacting 1 mole, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

6. The water-soluble thermostable cationic complex metal compound of the dye of the formula

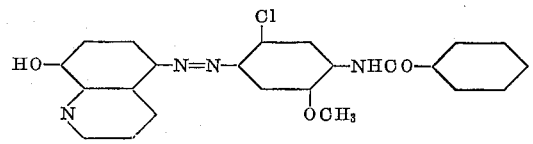

obtained by reacting 1 mole, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

7. The water-soluble thermostable cationic complex metal compound of the dye of the formula

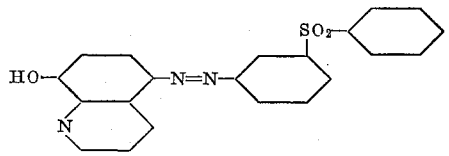

obtained by reacting 1 mole, per mole of starting dye, of a compound having a basity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

8. The water-soluble thermostable cationic complex metal compound of the dye of the formula

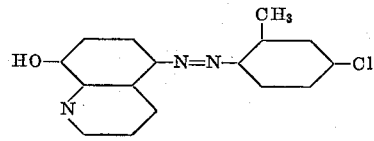

obtained by reacting 1 mole, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

9. The water-soluble thermostable cationic complex metal compound of the dye of the formula

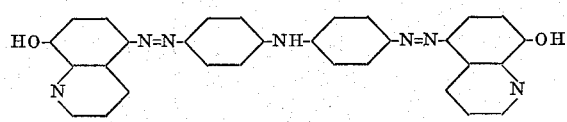

obtained by reacting 1 mole, per mole of starting dye, of a compound having a basicity lower than 33.3 percent and being selected from the group consisting of titanium trichloride, titanium tetrachloride, zirconium oxychloride, chromium chloride, chromium fluoride and chromium formate at a pH below 4 at a temperature of 50° to 150° C. in an organic solvent which (a) is a solvent for the starting dye and for the resulting metal-containing compound, (b) exhibits no alkalinity, (c) is at least partially miscible with water, and (d) does not react with the starting dye, the metal compound and the final dye.

References Cited by the Examiner

UNITED STATES PATENTS

| | | | |
|---|---|---|---|
| 1,775,644 | 7/1930 | Kammerer et al. | 260—146 |
| 1,846,074 | 2/1932 | Zitscher et al. | 260—155 |
| 1,898,911 | 2/1933 | Straub et al. | 260—146 |
| 2,508,404 | 5/1950 | Kvalnes et al. | 260—146 |
| 2,794,797 | 6/1957 | Davies et al. | 260—146 |
| 2,830,042 | 4/1958 | Dittmar et al. | 260—146 |
| 2,861,066 | 11/1958 | Andrew et al. | 260—155 |
| 2,872,440 | 2/1959 | Davies | 260—146 XR |

FOREIGN PATENTS

| | | |
|---|---|---|
| 406,778 | 3/1934 | Great Britain. |
| 561,054 | 5/1944 | Great Britain. |
| 800,145 | 8/1958 | Great Britain. |

CHARLES B. PARKER, *Primary Examiner.*

FLOYD J. HIGEL, *Assistant Examiner.*